(12) United States Patent
Bieniek et al.

(10) Patent No.: US 9,308,903 B2
(45) Date of Patent: Apr. 12, 2016

(54) TRACTION AID FUNCTION FOR VEHICLES HAVING MULTIPLE DRIVEN AXLES

(75) Inventors: Lars Bieniek, Forchtenberg (DE); Frank Dieterich, Abstatt (DE); Michael Frank Schmidt, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 291 days.

(21) Appl. No.: 13/816,440

(22) PCT Filed: Jul. 11, 2011

(86) PCT No.: PCT/EP2011/061744
§ 371 (c)(1),
(2), (4) Date: Apr. 11, 2013

(87) PCT Pub. No.: WO2012/019842
PCT Pub. Date: Feb. 16, 2012

(65) Prior Publication Data
US 2013/0204504 A1    Aug. 8, 2013

(30) Foreign Application Priority Data

Aug. 11, 2010 (DE) .......................... 10 2010 039 174

(51) Int. Cl.
| | |
|---|---|
| *B60K 1/00* | (2006.01) |
| *B60K 28/16* | (2006.01) |
| *B60T 8/175* | (2006.01) |
| *B60T 7/12* | (2006.01) |
| *B60T 8/26* | (2006.01) |
| *B60T 8/32* | (2006.01) |
| *B60T 8/34* | (2006.01) |
| *B60T 8/48* | (2006.01) |

(52) U.S. Cl.
CPC . *B60T 8/175* (2013.01); *B60T 7/12* (2013.01); *B60T 8/26* (2013.01); *B60T 8/32* (2013.01); *B60T 8/3205* (2013.01); *B60T 8/349* (2013.01); *B60T 8/4809* (2013.01); *B60W 2510/104* (2013.01); *B60W 2520/26* (2013.01)

(58) Field of Classification Search
USPC .................... 701/82; 180/197, 233, 244, 248; 303/139
See application file for complete search history.

(56) References Cited

U.S. PATENT DOCUMENTS

| | | | | |
|---|---|---|---|---|
| 5,799,748 | A * | 9/1998 | Origuchi ................ | B60K 23/08 180/233 |
| 2004/0222027 | A1* | 11/2004 | Barth .................... | B60K 28/16 180/197 |

FOREIGN PATENT DOCUMENTS

| | | |
|---|---|---|
| CN | 101045433 | 10/2007 |
| DE | 35 27 959 | 2/1987 |
| DE | 199 53 773 | 9/2000 |
| DE | 100 50 173 | 4/2001 |

(Continued)

*Primary Examiner* — Adam Tissot
(74) *Attorney, Agent, or Firm* — Kenyon & Kenyon LLP

(57) ABSTRACT

A method for transferring the drive torque from the wheels having a low traction to the wheels having a higher traction, the method being configured for vehicles in which not all driven wheels are equipped with a rotational speed sensor. In order to be able to perform a starting aid function, it is provided to measure the rotational speed of the cardan shaft and to put it in relation to the wheel rotational speed of at least one wheel which has a rotational speed sensor. If the deviation between the cardan shaft rotational speed and the measured wheel rotational speed is too high, at least one of the wheels, which does not have a rotational speed sensor, is braked automatically so that the vehicle is able to start.

2 Claims, 2 Drawing Sheets

(56) References Cited

FOREIGN PATENT DOCUMENTS

| | | |
|---|---|---|
| DE | 10 2009 005378 | 4/2010 |
| EP | 0 755 821 | 1/1997 |
| EP | 1 826 082 | 8/2007 |
| FR | 2 843 079 | 2/2004 |
| JP | S6012337 A | 1/1985 |
| JP | 2-169358 | 6/1990 |
| JP | H0648209 A | 2/1994 |
| JP | H10217932 A | 8/1998 |
| JP | 11-139273 | 5/1999 |
| JP | 2002087095 A | 3/2002 |
| JP | 2003-511301 | 3/2003 |
| JP | 2005-47313 | 2/2005 |
| JP | 2006188204 A | 7/2006 |
| JP | 2008-49887 | 3/2008 |
| WO | 01/28802 | 4/2001 |
| WO | 2010074227 A1 | 7/2010 |

* cited by examiner

TRACTION AID FUNCTION FOR VEHICLES HAVING MULTIPLE DRIVEN AXLES

FIELD OF THE INVENTION

The present invention relates to a method for transferring the drive torque from wheels having a lower traction to wheels having a higher traction, as well as a device which implements an automatic traction aid function for vehicles.

BACKGROUND INFORMATION

In motor vehicles, the engine torque is transferred to the driven wheels via the drive train, thus resulting in a certain drive torque acting on the wheels. In the case of a sufficiently high roadway friction value and a sufficiently high wheel contact force, the drive torque is converted into vehicle acceleration. If, however, the drive torque is too high in relation to the friction value, a drive slip occurs at the particular wheel and the wheel is spinning. In the most unfavorable case, it may happen that the vehicle accelerates very slowly or not at all.

For this reason, traction aid functions, such as ABD (automatic brake differential), were developed in the past which assisted with starting and accelerating of vehicles. One known specific embodiment of such a traction aid function includes, for example, a hydraulic unit which automatically builds up brake pressure during a starting operation at one or multiple slip-affected wheels to transfer the drive torque from the slip-affected wheel(s) to at least one other wheel which may apply a higher drive torque. In this way, it is possible to start and accelerate on greatly differing friction values, e.g., snow/ice on the one side of the vehicle and asphalt on the other side of the vehicle.

Such starting aid systems, however, require information regarding the wheel rotational speed of every single wheel. Every single wheel of the vehicle must thus be equipped with wheel rotational speed sensors. This is relatively complex and expensive, in particular in vehicles having more than two axles.

SUMMARY OF THE INVENTION

It is thus an object of the exemplary embodiments and/or exemplary embodiments of the present invention to provide an automatic traction aid for vehicles using which the drive torque of a wheel having a low traction may be transferred to a wheel having a higher traction, the traction aid according to the present invention requiring rotational speed information only from some but not from all wheels.

This object of the exemplary embodiments and/or exemplary embodiments of the present invention may be achieved by the features described herein. Further embodiments of the present invention are the subject matter of the further descriptions herein.

It is provided according to the exemplary embodiments and/or exemplary embodiments of the present invention to measure the rotational speed of a cardan shaft and to put it in relation to the wheel rotational speed of at least one wheel which is equipped with a rotational speed sensor. If the deviation between the cardan shaft rotational speed and the reference rotational speed is too high, this is an indication that another wheel, which is driven by the cardan shaft and does not have a rotational speed sensor, has a slip. In this case, at least one wheel which is driven by the cardan shaft and does not have a rotational speed sensor is braked automatically. In this way, the drive torque of this wheel is transferred to another wheel having a higher traction so that the vehicle starts and/or accelerates faster. It is thus also possible to implement a traction aid for vehicles in which not every wheel is equipped with wheel rotational speed sensors by analyzing the cardan shaft rotational speed.

According to the exemplary embodiments and/or exemplary embodiments of the present invention, the term "rotational speed of the cardan shaft" is also understood as any other rotational speed or proportional variable in the drive train of the vehicle which is proportional to the cardan shaft rotational speed.

The exemplary embodiments and/or exemplary embodiments of the present invention are elucidated below with reference to two examples.

EXAMPLE 1

A vehicle having multiple driven axles is at a standstill. The driver operates the accelerator pedal to accelerate the vehicle from the standing position. A rotational speed of approximately zero is measured at the wheels of a driven axle, such as the front axle. The cardan shaft rotational speed is, however, greater than zero. This means that the wheels of a driven rear axle have a drive slip. It is possible to recognize this solely based on the low correlation between the rotational speeds of the front wheels and the cardan shaft, without the necessity of having wheel rotational speed sensors at the rear wheels. In this case, the wheels of a driven rear axle which do not have wheel rotational speed sensors are braked automatically.

EXAMPLE 2

A vehicle having two driven rear axles is at a standstill. The driver operates the accelerator pedal to accelerate the vehicle from the standing position. From the rear wheels, only the wheels of one axle are equipped with wheel rotational speed sensors; the other rear wheels do not have wheel rotational speed sensors. The rotational speed sensors of the rear wheels deliver a certain rotational speed value n1. The rotational speed of the cardan shaft is too high in relation to the wheel rotational speed, the difference between the wheel rotational speed and the cardan shaft rotational speed exceeding a predefined threshold value. This is an indication that the wheels of the second rear axle have a slip. In this case, at least one wheel, which has no rotational speed sensor, of the second driven rear axle is braked automatically, and thus the drive torque is transferred to another wheel having a higher traction.

The method according to the present invention may be used in vehicles having multiple rear axles, the wheel of at least one of which does not have a rotational speed sensor.

According to a first specific embodiment of the present invention, none of the wheels of a driven axle have a rotational speed sensor. According to a second specific embodiment of the present invention, at least one wheel of a driven axle does not have a rotational speed sensor, while at least one other wheel of the axle has a rotational speed sensor.

If the vehicle has one or more driven axles, whose wheels all do not have a rotational speed sensor, all wheels of this axle/these axles may be braked.

If the vehicle has multiple driven axles, each of which has at least one wheel without a rotational speed sensor, all wheels of these axles may be automatically braked.

An automatic starting aid system for motor vehicles having multiple driven axles, in which not all driven wheels are equipped with wheel rotational speed sensors, correspondingly includes a control unit which puts a rotational speed of a cardan shaft in relation to a measured wheel rotational speed and which triggers an automatic brake intervention in at least one wheel without a rotational speed sensor, when the cardan shaft rotational speed is too high in relation to the wheel rotational speed. For this purpose, the control unit according to the present invention includes a corresponding analyzer and control algorithm.

The exemplary embodiments and/or exemplary embodiments of the present invention are elucidated in greater detail below on the basis of the attached drawings as an example.

DETAILED DESCRIPTION

Figure 1:
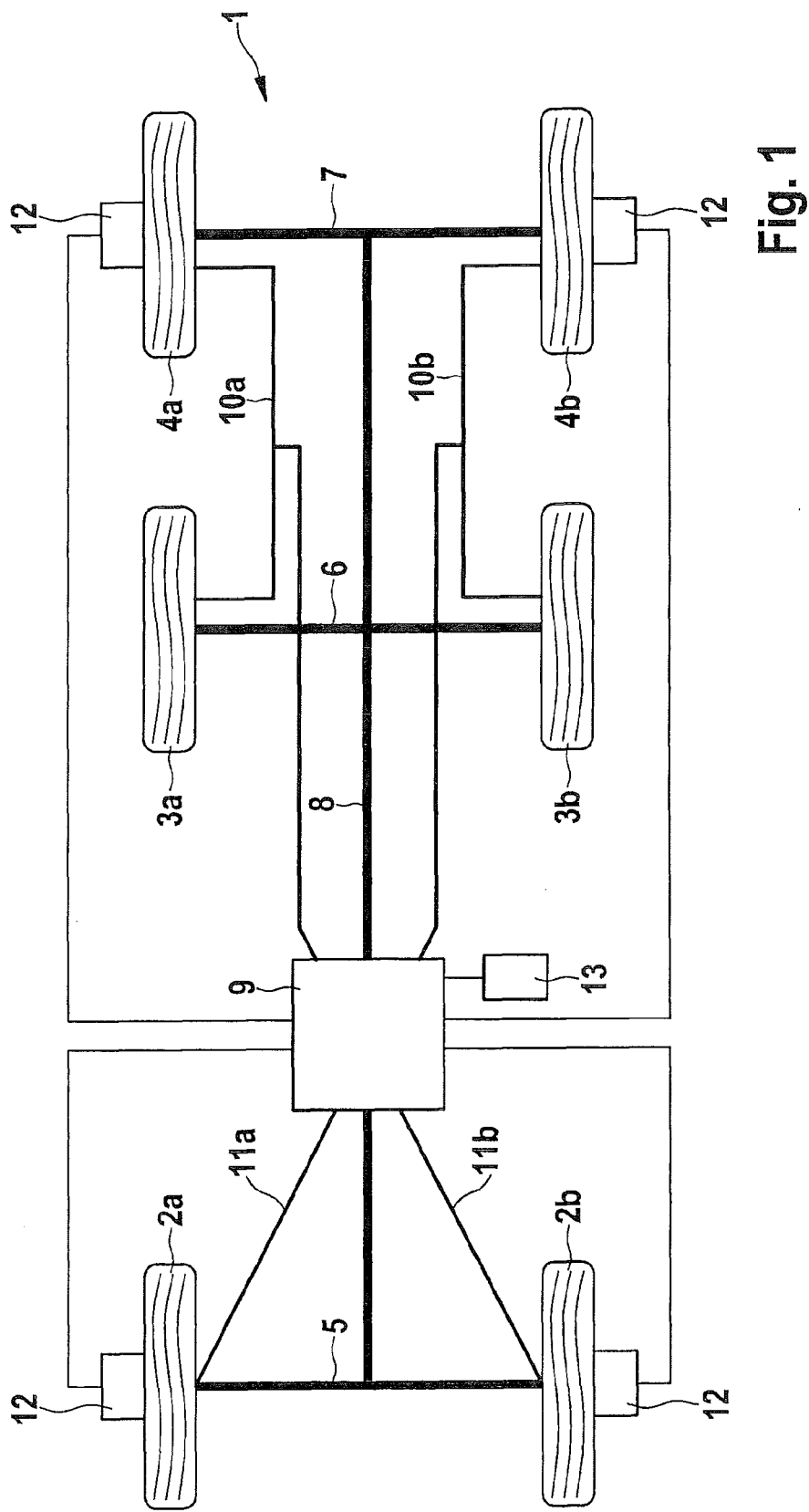
FIG. 1 shows a schematic representation of a tri-axle vehicle which has three driven axles and in which the wheels of one rear axle do not have rotational speed sensors.

FIG. 1 shows a schematic view of a vehicle 1 having a front axle 5 and two rear axles 6, 7. Each of the axles has two wheels which are identified by reference numerals 2a, 2b, 3a, 3b, and 4a, 4b. All axles 5, 6, 7 are driven axles, rear axles 6, 7 being driven via a cardan shaft 8.

In vehicle 1 illustrated in FIG. 1, wheels 2a, 2b of front axle 5 and wheels 4a, 4b of second rear axle 7 are equipped with wheel rotational speed sensors 12. In contrast to that, wheels 3a, 3b of first rear axle 6 do not include wheel rotational speed sensors 12. For this reason, it is not possible to directly measure the wheel slip at these wheels 3a, 3b.

If, for example, vehicle 1 is in a depression, first rear axle 6 having no or only very little contact force, the wheels of axle 6 are spinning during a starting process. Vehicle 1 is thus not able to drive off, although front axle 5 and second rear axle 7 have sufficient traction.

Using a traction aid function known from the related art, it would now be possible to operate the wheel brakes of first rear axle 6 and thus to shift the drive torque to wheels 2a, 2b; 4a, 4b of other axles 5, 7. Due to missing wheel rotational speed sensors 12 at wheels 3a, 3b of first rear axle 6, it is, however, not possible to directly recognize the drive slip. In order to still obtain information regarding the wheel slip at wheels 3a, 3b, the rotational speed of cardan shaft 8 is measured and analyzed with the aid of a rotational speed sensor 13. The rotational speed information of wheel rotational speed sensors 12 and cardan shaft sensor 13 is read in by a control unit 9 using a brake control algorithm. The cardan shaft rotational speed is subsequently put in relation to the rotational speed of at least one other wheel 2a, 2b; 4a, 4b. If the deviation between the cardan shaft rotational speed and the measured wheel rotational speed is too high, at least one of wheels 3a, 3b, which do not have a rotational speed sensor 12, is braked automatically. In this way, the drive torque of slip-affected wheels 3a, 3b is transferred to the other wheels 2a, 2b and 4a, 4b.

In the present exemplary embodiment, a shared brake circuit is provided for wheels 3a, 3b; 4a, 4b of rear axles 6, 7. The associated hydraulic lines are identified by reference numerals 10a, 10b. In the event of a brake intervention, all wheels 3a, 3b; 4a, 4b of rear axles 6, 7 are braked jointly so that, in this case, the drive torque is transferred to wheels 2a, 2b of front axle 5. This is, however, enough to help start the vehicle.

Figure 2:
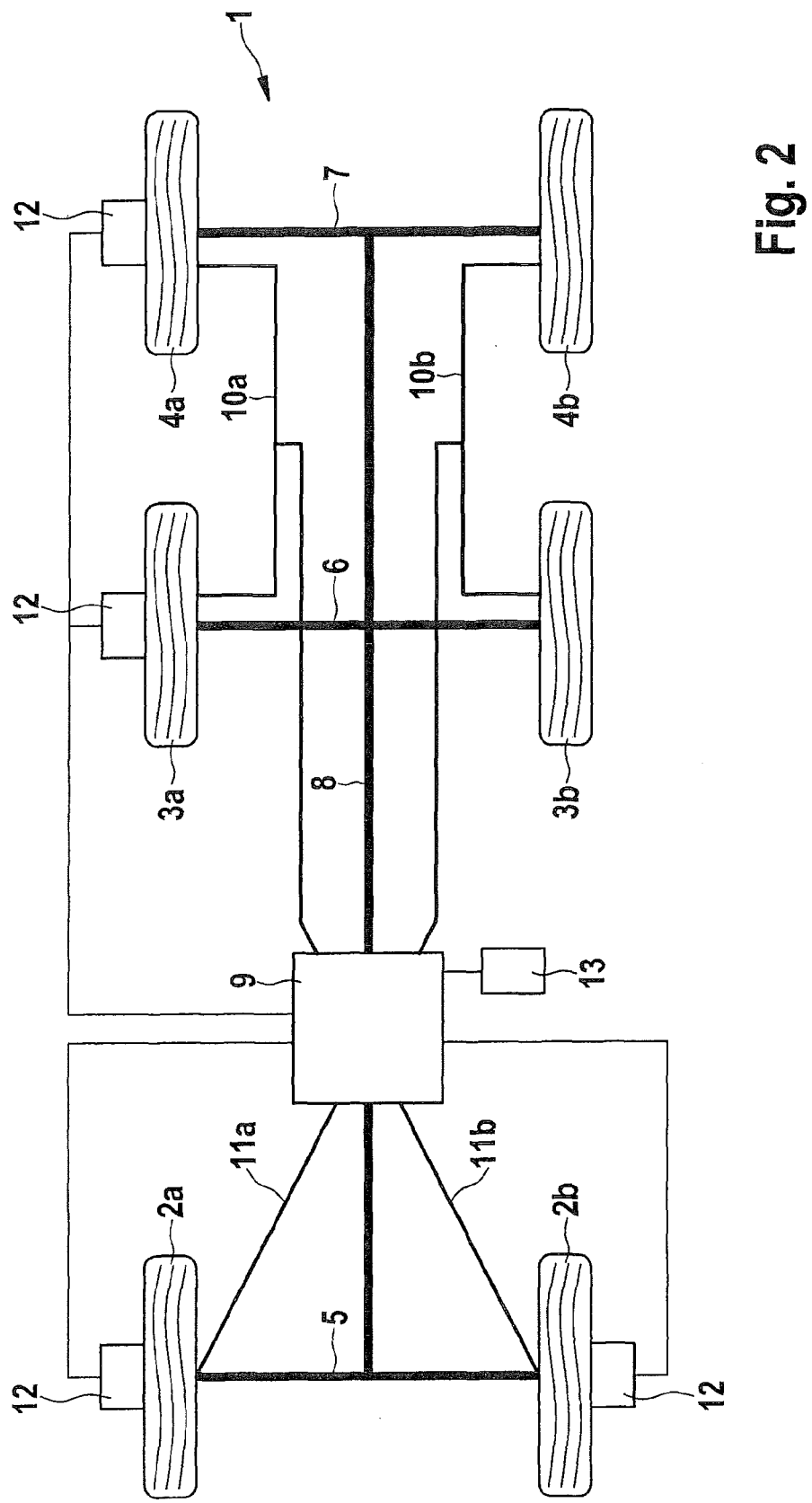
FIG. 2 shows a schematic view of a tri-axle vehicle which has three driven axles and in which one wheel of each rear axle does not have a rotational speed sensor.

FIG. 2 shows a second exemplary embodiment of a tri-axle vehicle 1 which has an essentially identical design as vehicle 1 illustrated in FIG. 1. However, in contrast to FIG. 1, wheel rotational speed sensors 12 have a different configuration. In the present case, wheels 2a, 2b of front axle 5 again each include a wheel rotational speed sensor 12. Rear axles 6, 7, however, each include only one wheel rotational speed sensor 12 at wheels 3a and 4a. Wheels 3b, 4b do not have wheel rotational speed sensors 12 so that the wheel rotational speeds cannot be measured directly. In order to still obtain a piece of information regarding a possibly occurring wheel slip at wheels 3b, 4b, the cardan shaft rotational speed is analyzed again. If, for example, rotational speed sensors 12 of wheels 3a, 4a deliver values of approximately zero and the rotational speed of cardan shaft 8 is too high in relation thereto, it must be assumed that at least one of wheels 3b, 4b is spinning. Using the illustrated rotational speed sensor system, it is not possible to determine exactly which one of wheels 3b, 4b has a wheel slip. It is, however, known that at least one of wheels 3b, 4b has a wheel slip. Therefore, both wheels 3b, 4b are braked, and the drive torque is thus transferred to wheels 2a, 2b of front axle 5 so that the vehicle is able to start.

According to one alternative specific embodiment of the present invention (not shown), rotational speed sensors 12 could also be situated diagonally, e.g., at wheels 3a, 4b, at the two rear axles 6, 7. The exemplary embodiments and/or exemplary embodiments of the present invention may also be used on vehicles having more than three driven axles.

What is claimed is:

1. A method for transferring a drive torque from wheels having a low traction to wheels having a higher traction for a vehicle having multiple driven axles, in which several but not all driven wheels are equipped with a rotational speed sensor, the method comprising:
   measuring, with a cardan shaft sensor, a rotational speed of a cardan shaft;
   measuring, with a rotational speed sensor, a wheel rotational speed of at least one wheel equipped with the rotational speed sensor;
   comparing, with a control unit, the rotational speed of the cardan shaft to the wheel rotational speed of the at least one wheel equipped with the rotational speed sensor; and
   upon determining that the deviation between the cardan shaft rotational speed and the wheel rotational speed is too high, automatically triggering a braking process, with the control unit, at at least one wheel that does not have a rotational speed sensor,
   wherein in the case of a vehicle which has at least two rear axles and in which the wheels of one rear axle do not have rotational speed sensors, at least the wheels of the rear axle without rotational speed sensors are braked automatically.

2. A method for transferring a drive torque from wheels having a low traction to wheels having a higher traction for a vehicle having multiple driven axles, in which several but not all driven wheels are equipped with a rotational speed sensor, the method comprising:
   measuring, with a cardan shaft sensor, a rotational speed of a cardan shaft;
   measuring, with a rotational speed sensor, a wheel rotational speed of at least one wheel equipped with the rotational speed sensor;
   comparing, with a control unit, the rotational speed of the cardan shaft to the wheel rotational speed of the at least one wheel equipped with the rotational speed sensor; and upon determining that the deviation between the cardan shaft rotational speed and the wheel rotational speed is too high, automatically triggering a braking process, with the control unit, at at least one wheel that does not have a rotational speed sensor, wherein in the case of a vehicle which has at least two rear axles and in which at least one wheel at each of the multiple rear axles does not have a rotational speed sensor, all wheels of the associated rear axles are braked so that the drive torque is transferred from these wheels to the front wheels.

* * * * *